(12) United States Patent
Gray

(10) Patent No.: US 11,518,313 B1
(45) Date of Patent: Dec. 6, 2022

(54) CARSEAT TRAY DEVICES AND METHODS

(71) Applicant: Aubrey Michael Gray, Atlanta, GA (US)

(72) Inventor: Aubrey Michael Gray, Atlanta, GA (US)

(*) Notice: Subject to any disclaimer, the term of this patent is extended or adjusted under 35 U.S.C. 154(b) by 0 days.

(21) Appl. No.: 17/361,015

(22) Filed: Jun. 28, 2021

(51) Int. Cl.
 *B60R 7/04* (2006.01)
 *B60N 3/00* (2006.01)

(52) U.S. Cl.
 CPC .............. *B60R 7/043* (2013.01); *B60N 3/002* (2013.01)

(58) Field of Classification Search
 CPC .......... A47C 7/62; B60R 7/043; B60N 3/002; B60N 3/001; B60N 2/3086; B60N 2/3081; A47B 31/06
 USPC ....................................................... 297/188.2
 See application file for complete search history.

(56) References Cited

U.S. PATENT DOCUMENTS

| | | | | |
|---|---|---|---|---|
| 2,429,050 A * | 10/1947 | Decker | ............... | B61D 33/00 312/235.7 |
| 5,342,109 A * | 8/1994 | Berry | ............... | B64D 11/0631 297/188.06 |
| 6,199,948 B1 * | 3/2001 | Bush | ............... | B60N 2/206 297/440.14 |
| 7,429,078 B1 * | 9/2008 | Tarlow | ............... | B60R 7/043 297/188.2 |
| 7,896,433 B2 * | 3/2011 | Mayer | ............... | B60N 2/686 297/440.2 |
| 2006/0091694 A1 * | 5/2006 | MacNeil | ............... | B60N 3/048 296/97.23 |
| 2010/0171346 A1 * | 7/2010 | Laframboise | ......... | B29C 66/742 297/284.6 |
| 2015/0028650 A1 * | 1/2015 | Rossi | ............... | B29D 99/0092 297/452.48 |
| 2017/0015228 A1 * | 1/2017 | Berno | ............... | B60N 2/3043 |
| 2020/0317137 A1 * | 10/2020 | Ahlning | ............... | B60N 2/32 |

* cited by examiner

*Primary Examiner* — Mark R Wendell
(74) *Attorney, Agent, or Firm* — The McPhillip Firm, P.C.; W. Sean McPhillip, Esq.

(57) ABSTRACT

Methods for using a carseat tray and carseat tray devices are disclosed. The device includes a front section, a rear section that is seamlessly attached to the rear section, a rim that is attached to the front section and the rear section, wherein the rim at the front section is on an incline with respect to the horizontal axis, and wherein the rim at the rear section is perpendicular to the horizontal axis, a plurality of raised surfaces on an internal surface, and a fastener attached to an external surface.

18 Claims, 7 Drawing Sheets

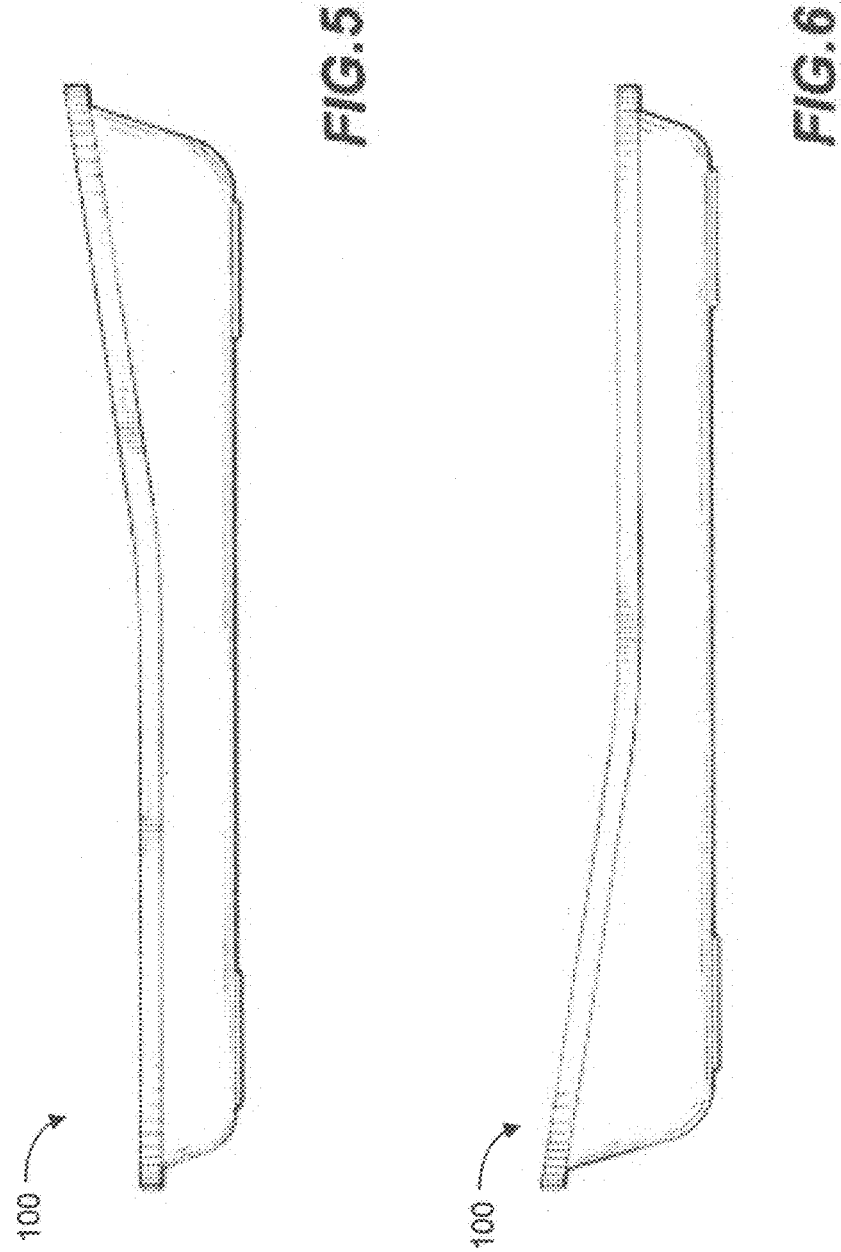

CARSEAT TRAY DEVICES AND METHODS

CROSS-REFERENCE TO RELATED APPLICATION

This application claims the benefit, under 35 U.S.C. § 120, of U.S. Design patent application Ser. No. 29/782,348, filed May 6, 2021, the contents of which are hereby incorporated by reference herein in their entirety as if fully set forth below.

FIELD OF INVENTION

The present invention generally relates to methods and devices for holding objects m a moving vehicle, and more particularly, to methods and devices for holding objects in place m a carseat tray as the vehicle travels, when sudden braking is applied, and/or the vehicle comes to a stop.

BACKGROUND

Car owners often carry multiple accessories in their car, for example, sunglasses, purses, wallets, food, make up, make up bags, pens, notepads, cellular phones, sheets of paper, keys, and other objects. In particular, when drivers are in a haste, these objects are thrown on the front seat or the back seat of the car. When the driver takes off quickly, applies heavy braking, or comes to a sudden stop, these objects can fall out of the seat and to various places in the car. Although finding objects that may have projected forward onto the floor, have become lodged between the seat and the center console, or have fallen under the seat, can prove to be a headache, doing so while the vehicle is in operation can result in horrific car accidents.

Therefore, there is a need for improved methods and devices for holding objects in place as the vehicle moves under the aforementioned conditions.

SUMMARY

It is an object of the present invention to provide methods and devices to meet the above stated needs. Generally, it is an object of the present invention to provide a device for holding objects in place as a vehicle moves, during sudden braking, and/or comes to a stop. Furthermore, the present invention can prevent accidents by removing the need to reach to secure objects as they are moving, and/or have fallen or moved. It should be noted that the carseat tray can be used with any vehicle including, but not limited to, cars, vans, and trucks. The device can include a front section and a rear section. Both the front section and rear section are connected seamlessly and include a rim that is attached at a top portion of the front section and at a top portion of the rear section. At the front section, the rim is tilted on an incline with respect to the horizontal axis. At the rear section, the rim is positioned substantially in accordance with the longitudinal axis. The carseat tray can further includes an inner surface that extends throughout the front section and the rear section, and an external surface that can include a fastener near the rear section.

In some examples, the rim at the front section can be tilted at approximately a thirty degree angle with respect to the horizontal axis.

According to some examples, the rim at front section can be tilted between approximately forty-five degrees and twenty degrees with respect to the horizontal axis.

In some examples, the rim can be between two to four inches in height at the front section.

In some examples, the rim is between one to one and a half inches in height at the rear section.

In some examples, the carseat tray has a weight of approximately eight ounces.

According to some examples, the fastener can be velcro.

In some examples, the fastener can be a button, a zipper, tape, a screw, and/or the like.

In some examples, the carseat tray be between seventeen and eighteen inches in length.

In some examples, the carseat tray can be approximately fifteen inches in width.

According to some examples, the carseat tray can be comprised of plastic, rubber, silicone, polyvinylchloride (PVC), and/or the like.

An example method for using a carseat tray can include attaching a first fastener to a car seat. Then, the method can include placing the carseat tray flush on the carseat with a front section of the carseat tray facing the front of the car seat. Next, the method can include connecting, a second fastener to the carseat tray. Finally, the method can include attaching the first fastener to the second fastener.

BRIEF DESCRIPTION OF THE DRAWINGS

The above and further aspects of this invention are further discussed with reference to the following description in conjunction with the accompanying drawings, in which like numerals indicate like structural elements and features in various figures. The drawings are not necessarily to scale, emphasis instead being placed upon illustrating principles of the invention. The figures depict one or more implementations of the inventive devices, by way of example only, not by way of limitation.

FIG. 5 is a front right side view of a carseat tray, according to aspects of the present invention;

FIG. 6 is a rear left side view of a carseat tray, according to aspects of the present invention;

DETAILED DESCRIPTION

An object of the present invention is to prevent objects on a vehicle seat from being displaced as sudden movement, braking, and/or stopping occurs. To meet some or all of these needs, example devices can include the carseat tray as described. Further, the carseat tray can be adaptable to hold, for example, cup holders and other holders known in the art.

Figure 1:
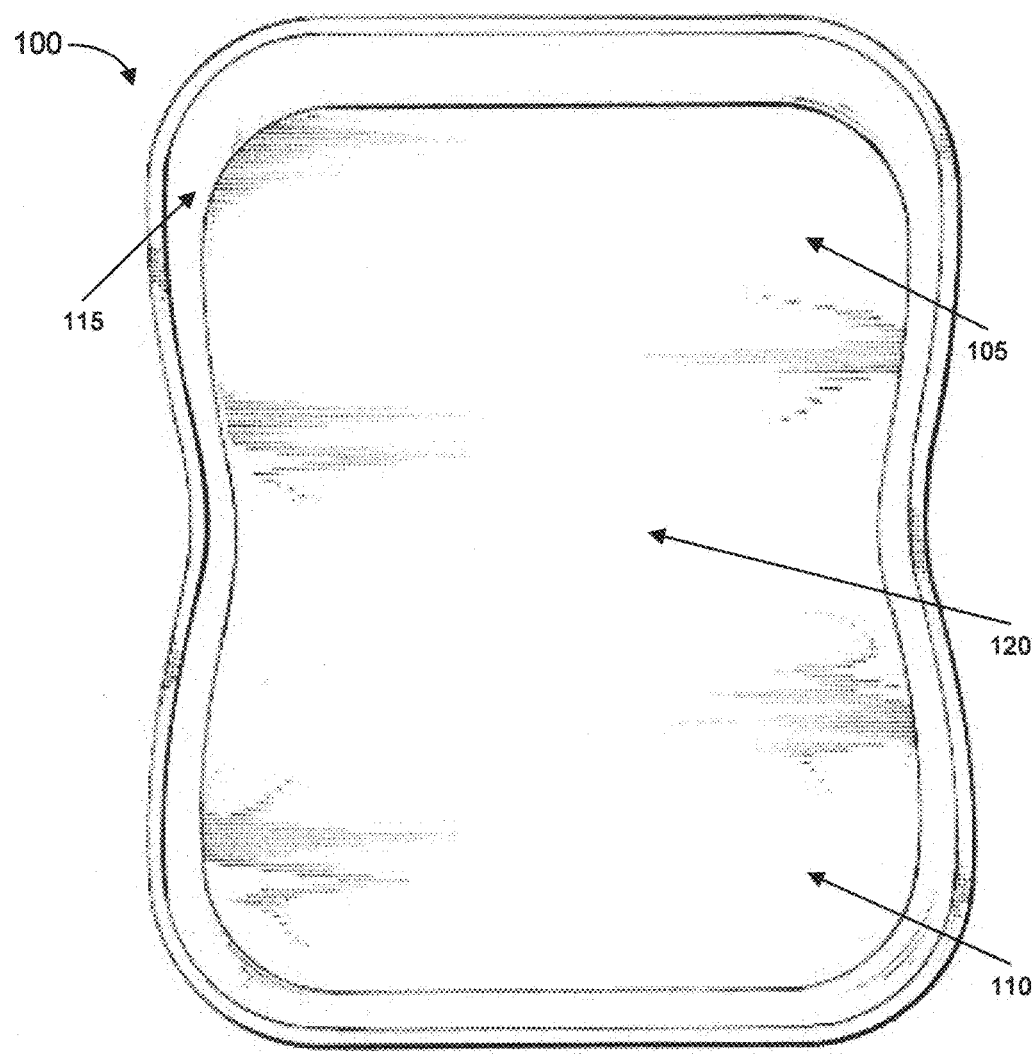
FIG. 1 is a top view of a carseat tray, according to aspects of the present invention.
Figure 2:
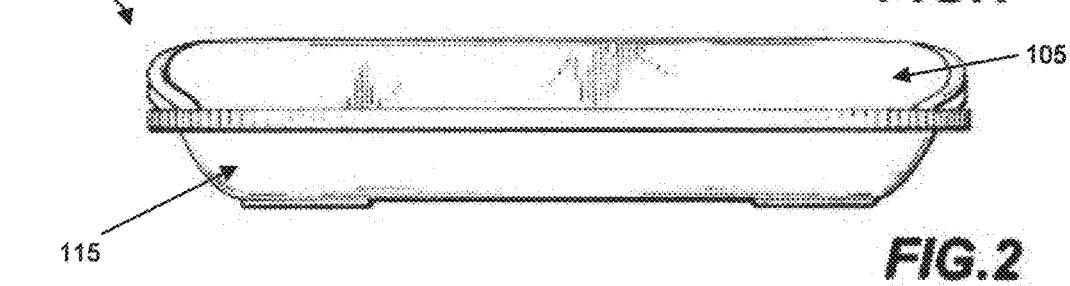
FIG. 2 is a rear view of a carseat tray, according to aspects of the present invention.
Figure 4:
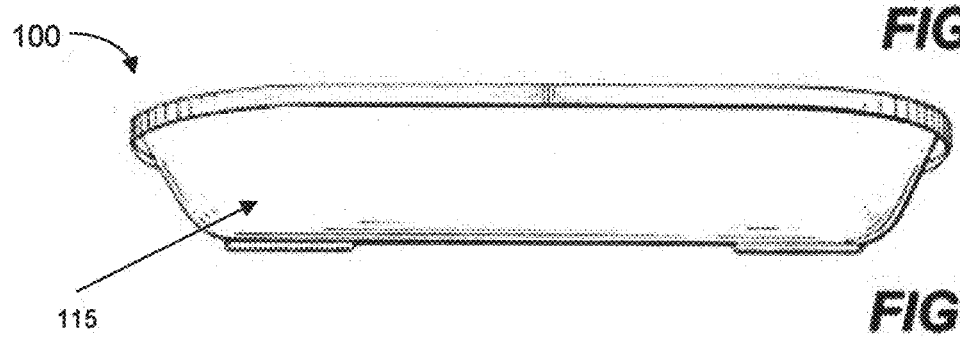
FIG. 4 is a front view of a carseat tray, according to aspects of the present invention.

FIG. 1 is an illustration of a carseat tray 100. As shown, the carseat tray 100 includes a front section 105 that can be seamlessly attached to the rear section 110. Both the front section 105 and the rear section 110 can include a rim 115. At the front section 105, the rim 115 can be positioned between twenty to forty-five degrees with respect to the horizontal axis. The angle of the rim 115 at the front section 105 can help prevent objects in the carseat tray 100 from falling out. Meanwhile, the rim 115 at the rear section 110 can be positioned substantially perpendicular to the horizontal axis. The rim 115 can surround the entire carseat tray 100. As shown in FIG. 2, towards the front of the carseat tray 100, i.e., near the front section 105, the rim 115 can have a height between two to four inches. Conversely and as shown in FIG. 4, the rim 115 near the rear section 110 can have a height of one to one and a half inches at the rear section. In sum, the carseat tray 100 can have dimensions of between seventeen and eighteen inches in length and approximately fifteen inches in width. It should be noted that the carseat tray 100 should not be limited to the aforementioned dimensions. Thus, the carseat tray 100 can be sized either larger or smaller according to the noted ratio, or in some examples, the carseat tray 100 may be sized differently from those dimensions.

Figure 3:
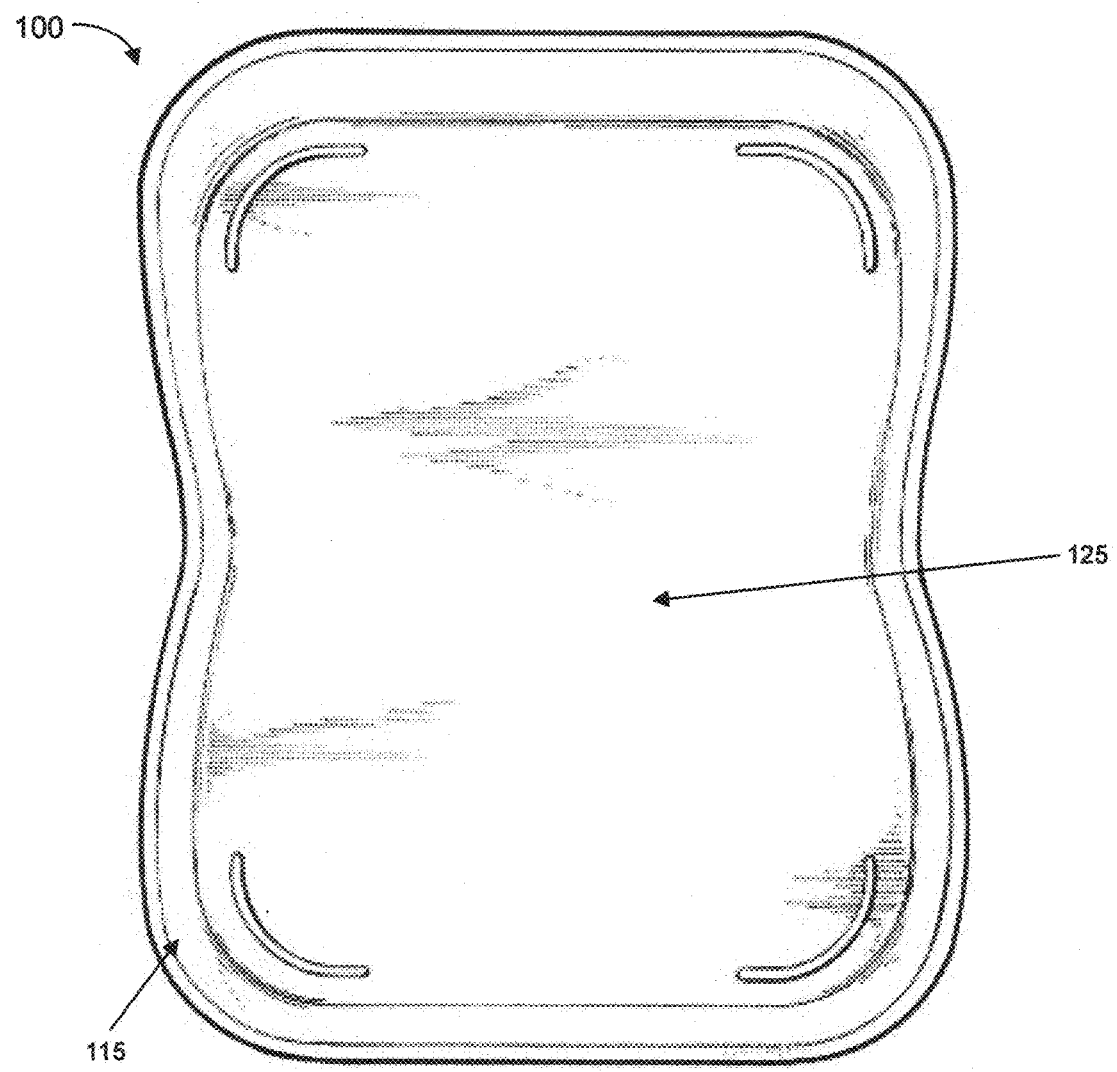
FIG. 3 is a bottom view of a carseat tray, according to aspects of the present invention.

As FIG. 3 illustrates, the carseat tray 100 can also include an external surface 125. When the carseat tray 100 is placed on a car seat, the carseat tray 100 can be placed with the front section 105 facing the dashboard of the vehicle, the rear section 110 facing toward the back of the vehicle, and the external surface 125 sitting on top of the car seat. The carseat tray 100 can further include fasteners (not shown) that are attached to the external surface 125, such as velcro that can hook onto a piece of velcro placed on the car seat. Although the carseat tray 100 is designed to remain in place on a car seat, the fasteners can help eliminate any movement of the carseat tray 100 when sudden braking is applied, when the vehicle is in motion, or when the vehicle is coming to an abrupt stop.

Figure 7:
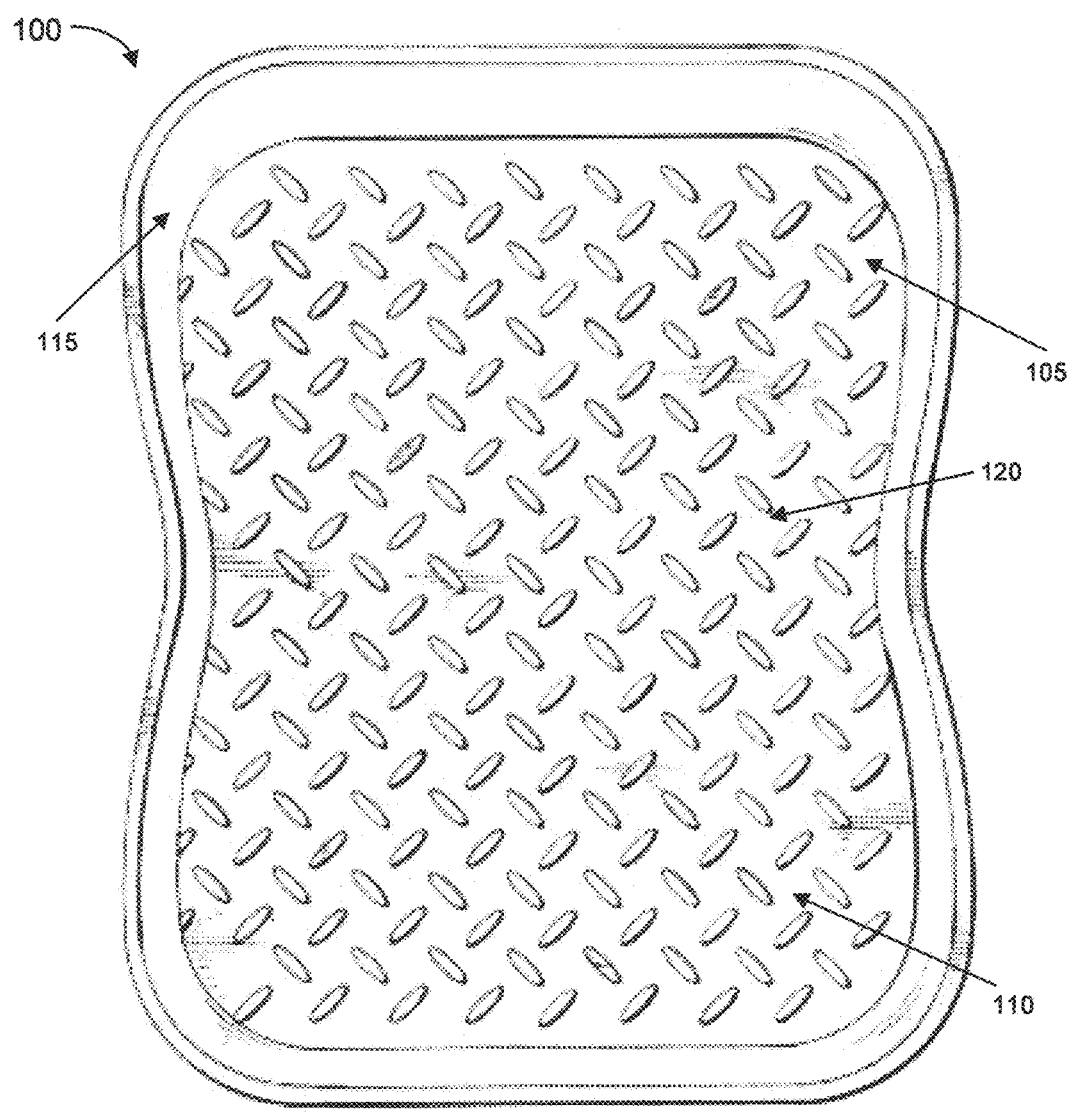
FIG. 7 is another top view of a carseat tray, according to aspects of the present invention.
Figure 8:
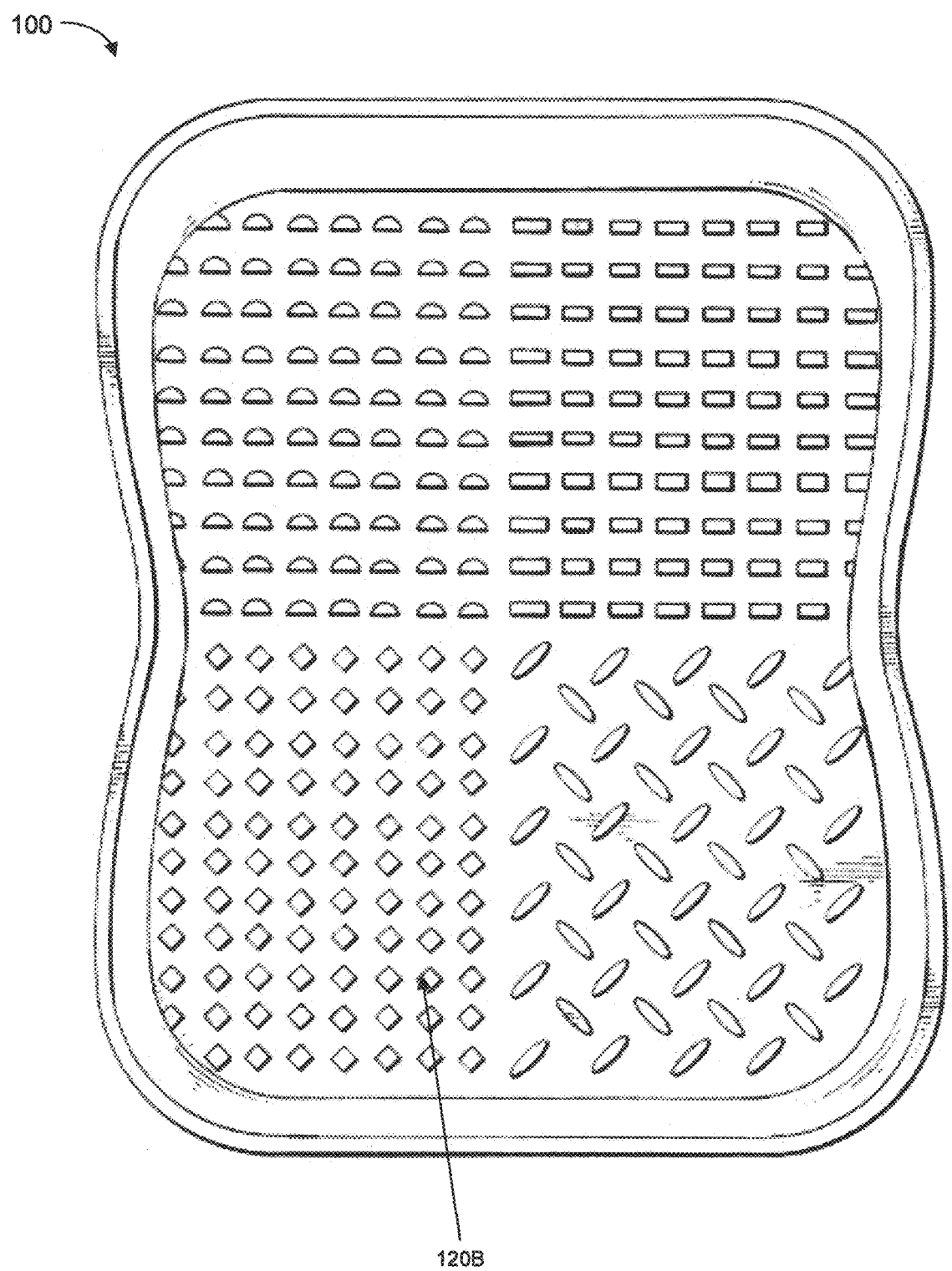
FIG. 8 is another top view of a carseat tray, according to aspects of the present invention.

The carseat tray 100 can further include an internal surface 120A that can be comprised of a plurality of uniform raised surfaces, such as those illustrated in FIG. 7. FIG. 8 shows an internal surface 120B that can be comprised of a plurality of different shaped raised surfaces. Further, the differently shaped raised surfaces can vary by quadrant. Both the plurality of uniform raised surfaces and the plurality of differently shaped raised surfaces can provide enhanced traction between the carseat tray 100 and objects inserted in the carseat tray 100.

Figure 9A:
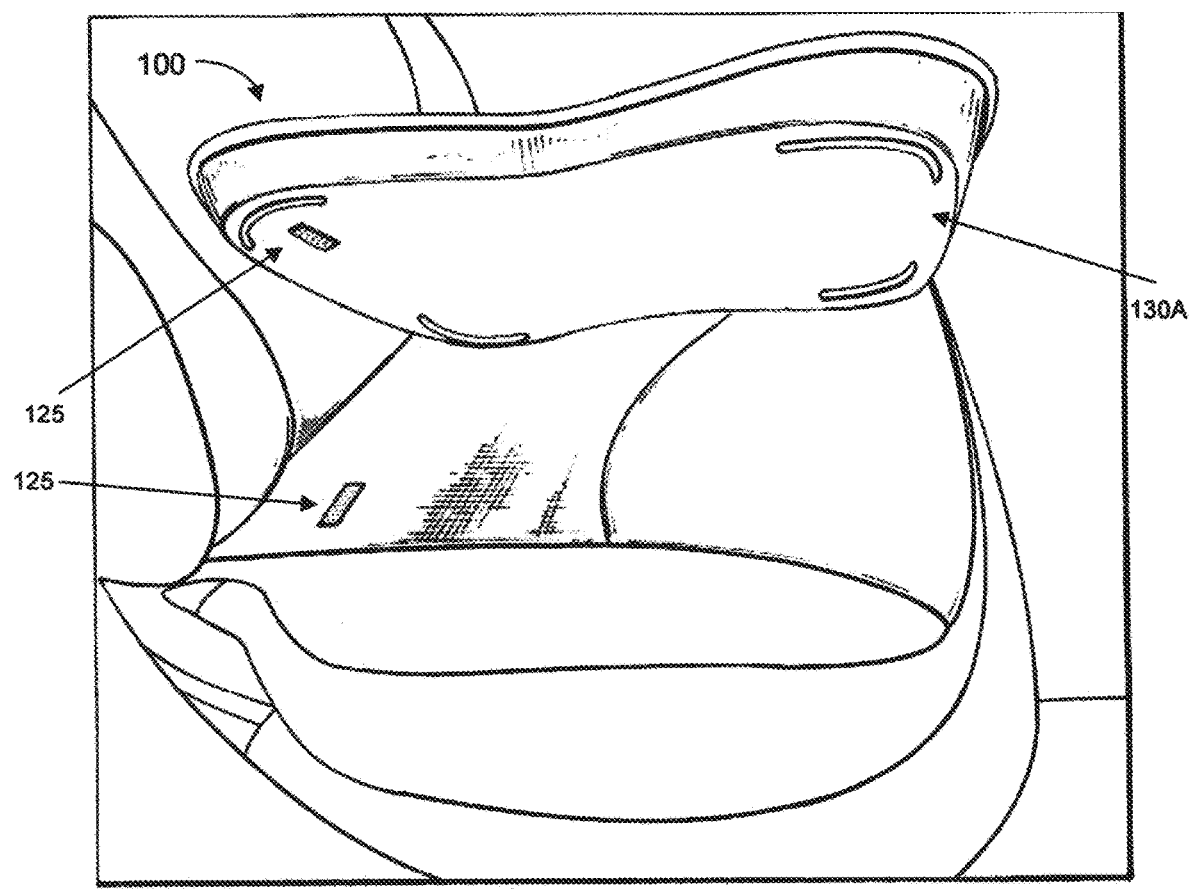
FIGS. 9A-B are bottom views of a carseat tray, according to aspects of the present invention.

FIG. 9A shows a bottom view of the carseat tray 100. From this view, an external surface 130A is shown with the fasteners 125 (here, velcro) positioned both on the rear of the car seat and near the rear section 110 of the carseat tray 100. It should be noted that the fasteners 125 can be placed in various positions on both the car seat and the carseat tray 100. The fasteners 125 provide attachment between the car seat and the carseat tray 100, such that when the vehicle stops, takes off, and/or sudden braking is applied, the carseat tray 100 remains in place along with any objects that are within the carseat tray 100.

Figure 9B:
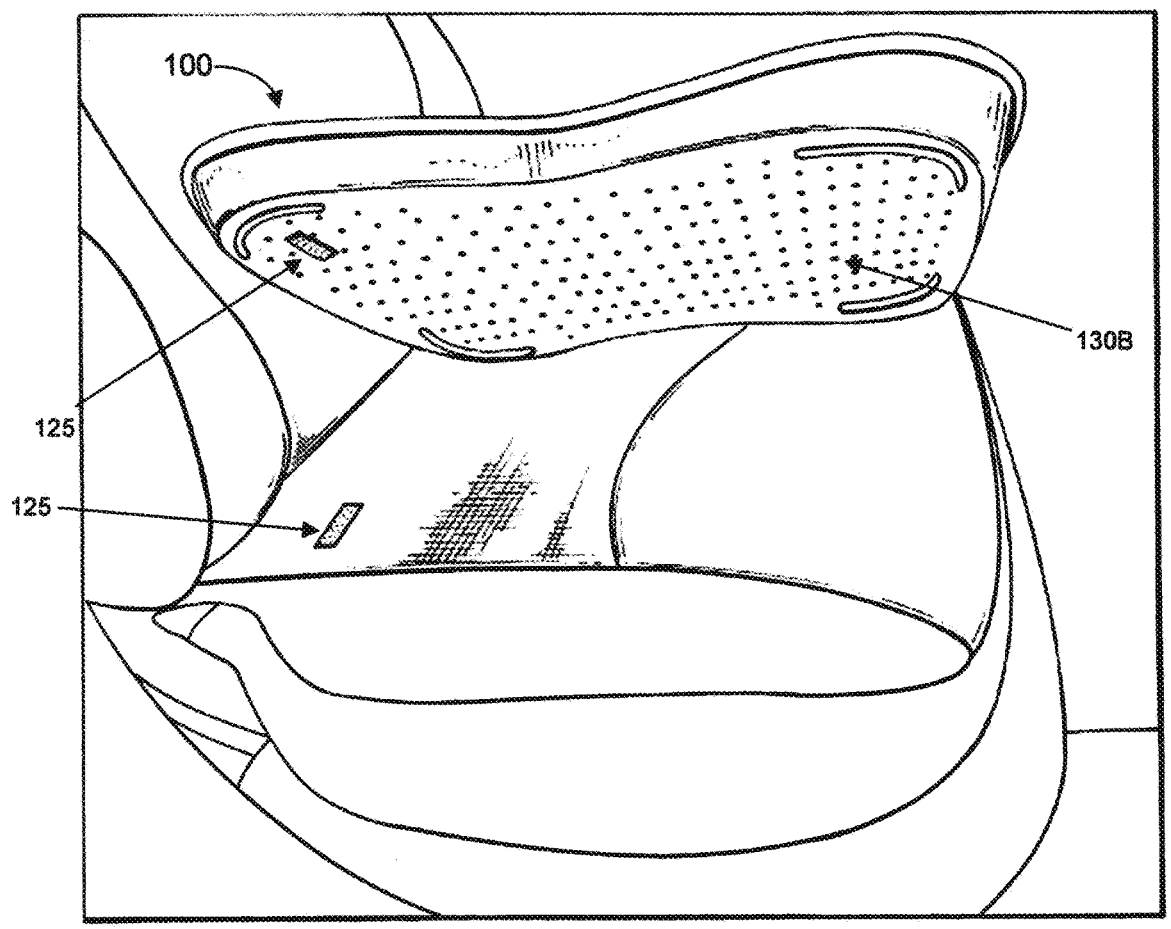

FIG. 9B illustrates the carseat tray 100 having a plurality of raised surfaces on the external surface 130B. Similar to the internal surface 120A and the internal surface 120B described above, the external surface 130B can be comprised of a plurality of raised surfaces, which can be a plurality of uniform surfaces, a plurality of differently shaped raised surfaces, or even a plurality of differently shaped raised surfaces separated by quadrants. In this example, the plurality of raised surfaces can provide enhanced traction between the carseat tray 100 and the car seat.

What is claimed is:

1. A carseat tray comprising:
a front section;
a rear section that is seamlessly attached to the front section;
a rim attached to the front section and the rear section at a top portion of the front section and at a top portion the rear section, respectively,
wherein the rim at the front section is positioned at an angle between twenty to and forty-five degrees with respect to the horizontal axis,
wherein the rim at the rear section is positioned perpendicular to the horizontal axis,
wherein the rim is between two to four inches in height at the front section, and
wherein the rim is between one to one and a half inches in height at the rear section;
an interior surface that covers the front section and the rear section; and
a fastener attached to the rear section on an exterior surface.

2. The carseat tray of claim 1, wherein the carseat tray is between sixteen and eighteen inches in length.

3. The carseat tray of claim 1, wherein the carseat tray is between fourteen and fifteen inches in width.

4. The carseat tray of claim 1, wherein the carseat tray has a weight of approximately eight ounces.

5. The carseat tray of claim 1, wherein the external surface is comprised of a plurality of raised surfaces.

6. The carseat tray of claim 1, wherein the interior surface is comprised of a plurality of uniform raised surfaces.

7. The carseat tray of claim 1, wherein the interior surface is comprised of a plurality of differently shaped raised surfaces.

8. The carseat tray of claim 1, wherein the interior surface has four quadrants, and wherein each of the four quadrants has a uniquely shaped plurality of raised surfaces.

9. A carseat tray comprising:
a front section;
a rear section seamlessly attached to the front section; and
a rim attached to the front section and the rear section,
wherein the rim at the front section is positioned at an angle between twenty to and forty-five degrees with respect to the horizontal axis,
wherein the rim at the rear section is positioned perpendicular to the horizontal axis,
wherein the rim is between two to four inches in height at the front section, and
wherein the rim is between one to one and a half inches in height at the rear section.

10. The carseat tray of claim 9, further comprising an interior surface that covers the front section and the rear section.

11. The carseat tray of claim 10, wherein the interior surface is comprised of a plurality of uniform raised surfaces.

12. The carseat tray of claim 10, wherein the interior surface is comprised of a plurality of differently shaped raised surfaces.

13. The carseat tray of claim 10, wherein the interior surface has four quadrants, and wherein each of the four quadrants has a uniquely shaped plurality of raised surfaces.

14. The carseat tray of claim 9, wherein the carseat tray is between, sixteen and eighteen inches in length.

15. The carseat tray of claim 9, wherein the carseat tray is between fourteen and fifteen inches in width.

16. The carseat tray of claim 9, wherein the carseat tray has a weight of approximately eight ounces.

17. The carseat tray of claim 9, further comprising a fastener attached to an external surface.

18. The carseat tray of claim 17, wherein the external surface is comprised of a plurality of raised surfaces.

* * * * *